US007177750B2

(12) United States Patent
Schröder

(10) Patent No.: US 7,177,750 B2
(45) Date of Patent: Feb. 13, 2007

(54) SYSTEM FOR INFLUENCING THE SPEED OF A MOTOR VEHICLE

(75) Inventor: Marko Schröder, Koblenz (DE)

(73) Assignee: Lucas Automotive GmbH (DE)

( * ) Notice: Subject to any disclaimer, the term of this patent is extended or adjusted under 35 U.S.C. 154(b) by 41 days.

(21) Appl. No.: 11/132,912

(22) Filed: May 19, 2005

(65) Prior Publication Data

US 2005/0216172 A1 Sep. 29, 2005

Related U.S. Application Data

(63) Continuation of application No. PCT/EP03/13026, filed on Nov. 20, 2003.

(30) Foreign Application Priority Data

Nov. 21, 2002 (DE) ................................ 102 54 421

(51) Int. Cl.
*G06F 7/00* (2006.01)
*B60T 7/12* (2006.01)

(52) U.S. Cl. .......................... 701/96; 701/93; 340/903; 180/170

(58) Field of Classification Search .................... 701/1, 701/36, 93, 96, 117–119, 123, 91, 94, 102, 701/110; 340/438–439, 901–905, 441, 933, 340/936; 73/291, 114, 123; 180/167–170, 180/179

See application file for complete search history.

(56) References Cited

U.S. PATENT DOCUMENTS 4,308,536 A 12/1981 Sims, Jr. et al.

(Continued)

FOREIGN PATENT DOCUMENTS

DE 44 46 859 6/1995

(Continued)

OTHER PUBLICATIONS

Grimes, et al., "Automotive Radar: A Brief Review", Proceedings of the IEEE, vol. 62, No. 6, Jun. 1974, pp. 304-322.
English translation of DE 19821163 Abstract.
English translation of DE 19828160 Abstract.
English translation of JP 2000298800 Abstract.

*Primary Examiner*—Gertrude A. JeanGlaude
(74) *Attorney, Agent, or Firm*—MacMillan, Sobanski & Todd, LLC

(57) ABSTRACT

System for evaluating the driving environment of a motor vehicle and for influencing the speed of the motor vehicle in its own lane, with an electronic control unit, which is connected to a signal generator generating a signal which is characteristic of the desired speed of the motor vehicle, a signal generator generating a signal which is characteristic of the yaw rate of the motor vehicle about its vertical axis, a signal generator which generates, for objects located in the space lying in front of the motor vehicle in its direction of travel, a signal which is characteristic of the distance and orientation of the objects with respect to the motor vehicle and which reproduces the speed relative to the speed of the driver's motor vehicle, and/or the distance relative to the driver's motor vehicle, and/or the angular offset or the lateral deviation relative to the vehicle longitudinal axis of the driver's motor vehicle, and a signal generator generating a signal which is characteristic of the speed at least of one wheel of the motor vehicle, and which unit is connected to at least one control device influencing the road behavior of the motor vehicle in order to supply this with output signals which are derived from the road behavior of the motor vehicle located in front of the driver's motor vehicle, with characteristic values having fluid boundaries being established in the electronic control unit for at least two different road environments (town traffic, country road, motorway) in order to distinguish the type of road on which the driver's motor vehicle is traveling, wherein a quantity influencing the respective characteristic value is the "environmental speed" established from the speeds of the objects detected in the space in front of the driver's motor vehicle and preferably determined by averaging.

26 Claims, 10 Drawing Sheets

U.S. PATENT DOCUMENTS 4,632,543 A 12/1986 Endo
4,829,434 A * 5/1989 Karmel et al. ................ 701/59
5,388,048 A 2/1995 Yavnayi et al.
5,483,242 A 1/1996 Grein et al.
5,510,990 A 4/1996 Hibino et al.
5,529,139 A 6/1996 Kurahashi et al.
5,612,699 A 3/1997 Yamada
5,633,642 A 5/1997 Höss et al.
5,638,790 A 6/1997 Minowa et al.
5,648,905 A 7/1997 Izumi et al.
5,710,565 A 1/1998 Shirai et al.
5,724,944 A 3/1998 Minowa et al.
5,913,917 A * 6/1999 Murphy ...................... 701/123
5,926,126 A 7/1999 Engelman
5,947,087 A 9/1999 Minowa et al.
5,999,847 A 12/1999 Elstrom
5,999,874 A 12/1999 Winner et al.
6,018,308 A 1/2000 Shirai
6,032,646 A 3/2000 Minowa et al.
6,040,795 A 3/2000 Watanabe
6,076,034 A 6/2000 Satoh et al. .................. 701/70
6,107,956 A 8/2000 Russell et al.
6,114,973 A 9/2000 Winner et al.
6,114,985 A 9/2000 Russell et al.
6,116,369 A 9/2000 King et al.
6,147,637 A 11/2000 Morikawa et al.
6,188,950 B1 2/2001 Tsutsumi et al.
6,206,123 B1 * 3/2001 Kim .......................... 180/170
6,226,571 B1 5/2001 Kai
6,233,516 B1 5/2001 Egawa
6,260,539 B1 7/2001 Minowa et al.
6,278,362 B1 * 8/2001 Yoshikawa et al. ......... 340/439
6,294,986 B1 9/2001 Landsiedel
6,300,896 B1 * 10/2001 Kull et al. .................. 342/104
6,304,811 B1 10/2001 Prestl
6,311,120 B1 10/2001 Asada
6,401,024 B1 6/2002 Tange et al.
6,401,694 B2 6/2002 Minowa et al.
6,427,533 B1 * 8/2002 Yoshida ....................... 73/291
6,466,863 B2 10/2002 Shirai et al.
6,468,972 B1 10/2002 Pruche et al.
6,493,625 B2 12/2002 Andreas et al.
6,526,346 B2 2/2003 Ishizu et al.
6,543,422 B2 4/2003 Minowa et al.
6,573,859 B2 6/2003 Tokoro
6,653,935 B1 11/2003 Winner et al.
6,675,094 B2 1/2004 Russell et al.
6,721,645 B2 4/2004 Lueder et al.
6,763,904 B2 7/2004 Winner et al.
6,769,504 B2 8/2004 Kobayashi et al.
6,775,605 B2 8/2004 Rao et al.
6,784,828 B2 8/2004 Delcheccolo et al.
6,816,084 B2 11/2004 Stein
6,842,687 B2 1/2005 Winner et al.
6,856,887 B2 2/2005 Akabori et al.
6,889,161 B2 5/2005 Winner et al.
2002/0003489 A1 1/2002 Samukawa et al.
2002/0032514 A1 3/2002 Kuroda et al.
2002/0044080 A1 4/2002 Shirai et al.
2002/0049539 A1 4/2002 Russell et al. .............. 701/301
2002/0121398 A1 9/2002 Kikuchi et al.
2002/0128751 A1 9/2002 Engstrom et al. ............. 706/20
2003/0154011 A1 8/2003 Rao et al.

FOREIGN PATENT DOCUMENTS

DE 19835518 A1 4/1999
DE 19757063 A1 6/1999
DE 19901175 A1 7/1999
DE 198 21 163 11/1999
DE 19821163 A1 11/1999
DE 19828160 A1 12/1999
DE 19637245 C2 2/2000
DE 19637053 C2 3/2000
DE 19954536 A1 5/2001
DE 10006403 A1 8/2001
DE 10105240 A1 8/2001
DE 10007501 A1 9/2001
DE 10018556 A1 10/2001
DE 10105240 A1 11/2001
DE 10122860 A1 11/2001
EP 0 612 641 8/1994
EP 0 928 714 7/1999
EP 0657857 B1 3/2001
EP 0726473 B1 8/2001
EP 0897824 B1 9/2004
JP 2000298800 A 10/2000
WO 95/14939 6/1995
WO WO 01/79882 A1 10/2001
WO WO 02/084330 A1 10/2002

* cited by examiner relative distance
relative speed
angle offset
wheel speed
steering angle
accelerator pedal position
objects
attributes
OL
Hist
FUB
OA
electric brake
engine
management

SYSTEM FOR INFLUENCING THE SPEED OF A MOTOR VEHICLE

CROSS REFERENCE TO RELATED APPLICATION

This application is a continuation of application number PCT/EP03/013026 filed Nov. 20, 2003, the disclosures of which are incorporated herein by reference, which claims priority to German Application No. 102 54 421.2 filed Nov. 21, 2002, the disclosures of which are incorporated herein by reference.

BACKGROUND OF THE INVENTION

The invention relates to a system for influencing the speed of a motor vehicle. Control systems of this kind are increasingly being used in motor vehicles, in particular upper and upper medium class private cars, under the name of ACC (Autonomous/Adaptive Cruise Control).

Devices are known which control the driving speed of a motor vehicle, wherein the driver can preset a desired speed and the driving speed of the motor vehicle is brought to this target speed by a speed controller and kept there all the time this device is activated. However, no monitoring of the driving speed of a motor vehicle traveling ahead takes place in this case. Therefore the driver has to intervene if his own motor vehicle comes too close to the motor vehicle traveling ahead. Similarly, if the speed of the motor vehicle traveling ahead increases, the driver can also increase the speed of his own vehicle correspondingly.

A device which removes from the driver the monitoring of the distance from the motor vehicle traveling ahead and adjusts the speed of his own motor vehicle to the speed of a motor vehicle traveling ahead is described, for example, in EP-A-0 612 641.

In order to give ACC systems of this kind broader use successfully, safe and reliable operation of these systems is required, which also results in greater driving comfort and therefore increased acceptance by drivers. The invention is concerned in particular with the problem of improving the selection of the target vehicle and thus of making the driving behavior or performance of the driver's vehicle more reliable.

BRIEF SUMMARY OF THE INVENTION

According to the invention, in order to distinguish the type of road on which the driver's vehicle travels, characteristic values having fluid boundaries are established in the electronic control unit (ECU) for at least two different road environments (town traffic, country road, highway) wherein a quantity influencing the respective characteristic value is the "environmental speed" established from the speeds of the objects detected in the space in front of the driver's vehicle and preferably determined by averaging.

The invention in this case is based on the realization that a more intensive evaluation of the driving environment of one's own vehicle is required. The results of this evaluation of the driving environment are then also to be used when influencing the speed of the driver's motor vehicle.

The characteristic value "environment speed" preferably has the dimension speed (distance/time) to reflect the situation in the real road traffic, in particular the speed and the performance of other road users. This allows a continuous change of this characteristic value which might also have fluid boundaries. The boundaries between two different road environments (town traffic <-> country road, country road <-> highway, town traffic <-> highway) may also be different from driver to driver.

The function of an ACC system of the kind according to the invention is based on the fact that arranged on the front part of one's own vehicle is a sensor, generally orientated rigidly towards the front and usually a radar sensor, with a relatively narrow detection range. This sensor serves to detect objects located in the detection range and to report them to an ECU (with the distance and lateral drift or angle position to the central axis of the sensor or of the motor vehicle and possibly the size of the object).

From these data and from several other data acquired in one's own vehicle (speed, rate of revolutions or yaw rate about the vertical axis of own vehicle, side acceleration of own vehicle, etc.) firstly the lane or the driving corridor of one's own vehicle is determined in the ECU. Based on this, a, generally the closest, motor vehicle in one's own driving corridor is then determined according to certain criteria as the target vehicle traveling ahead, in order to control the distance, based on this vehicle, by intervening in the engine control, the gear control and the braking system. It is therefore possible for one's own vehicle to follow a vehicle traveling ahead at a safe distance (possibly depending on the speed and other factors), fixing and maintaining the safe distance being performed by interventions in the engine control system and in the braking system of one's one motor vehicle independent of the driver. The driver generally presets only one desired speed of his own motor vehicle and/or a desired distance of his own motor vehicle from a target motor vehicle.

In other words the invention provides a system for evaluating the driving environment of a motor vehicle and for influencing the speed of the motor vehicle. This system has an ECU which is connected to a signal transmitter generating a signal characteristic of the desired speed/desired distance of the motor vehicle. Moreover, the momentary (actual) speed of one's own motor vehicle is fed to the ECU.

Moreover, the ECU is connected to a signal transmitter generating a signal characteristic of the rate of revolutions of the motor vehicle about its vertical axis.

Furthermore, the ECU is connected to a signal transmitter which generates a signal characteristic of objects located in the area in front of the motor vehicle in the direction of travel of the motor vehicle in respect of their distance and orientation to the motor vehicle. This may be a radar sensor, an ultrasound or infrared sensor, or else a picture sensor (video camera). The area scanned by the sensor is approximately conical or lobar and has a length of approximately 100–250 meters and an aperture of approximately 12°, depending on the actual circumstances of the environment. Safe detection/selection can therefore be made for objects located at a distance of approximately 170+/−30 meters from one's own vehicle or are moving in front of it within this range.

Finally, the ECU is connected to a signal transmitter generating a signal characteristic of the speed of at least one wheel of the motor vehicle. This may be, for example, the revolution counter of the anti-blocking system (ABS). In the ECU the signals from these signal transmitters are processed by means of one or more computer unit(s). The results therein determined are fed as output signals derived from the driving behavior of the motor vehicle located in front of one's own motor vehicle by the ECU to at least one control device which has an influence on the driving behavior of one's own motor vehicle.

As detection of the objects takes place in a chronological grid of tens of milliseconds (for example 50 milliseconds), the chronological changes in the positions of the individual objects can be established in the ECU. Taking into account the movement(s) of one's own vehicle, movements of the objects and possibly their relative speed can also be calculated in the ECU. From this the attributes "stationary", "moving substantially in the same direction as own vehicle" or "moving substantially in the opposite direction to own motor vehicle" are also allocated to the object in the ECU.

In other words, for objects located in the area at least their speed relative to the speed of one's own vehicle, their distance relative to one's own motor vehicle and the angle offset or the lateral drift relative to the longitudinal axis of one's own vehicle are continually detected and evaluated in the ECU from signals from the signal transmitter which generates a signal characteristic of objects located in the area in front of the motor vehicle in the driving direction of the motor vehicle in respect of their distance and orientation to the motor vehicle.

For practical reasons the number of objects observed is limited in this case. Stationary targets, in other words those whose relative speed in the direction of travel of one's own motor vehicle is the same as the speed of one's own vehicle with opposite algebraic signs, are excluded. Objects located close to one's own motor vehicle are preferred to objects located further away.

All objects classified by the ECU as being considered in any way as target objects on the basis of the signals detected by the radar sensor are kept in an object table in which the respective attributes and data of the objects are also kept and entered or updated by the ECU using the current (new) calculations.

In particular, to reduce the possible targets located in the lane in front of one's own vehicle, generally not the entire detection area—limited by the aperture of the (radar) sensor—is evaluated, but a reduced region in respect thereof. This measure reduces the number of objects to be observed. For simplicity's sake, however—insofar as there is no explicit reference thereto—it will be assumed below that the range actually evaluated and the detection area in front of one's own motor vehicle coincide.

As explained above, one stage in determining the (distance) from one's own motor vehicle to "tracking" vehicles is determining one's own lane. This is established by its centre line, its width or approximately by sections with a constant radius of curvature. The present system modifies the radius of curvature R of the bend of the lane of the centre of gravity of one's own motor vehicle using the change in the angle bearing of the objects traveling ahead and the absolute position of the objects traveling ahead compared with the momentarily predicated lane in the ECU to establish the centre line of one's own lane in the area detected in front of the motor vehicle.

As initial value for the radius of curvature R (for example if there are no objects traveling ahead) the speed of one's own motor vehicle divided by its momentary rate of revolutions is determined and fed to the ECU by the appropriate signal transmitter. The radius of curvature of the bend in the lane is then modified in the ECU by the lateral speeds as a function of objects moving in the area detected in front of the motor vehicle.

A few further criteria which lead to a change in the radius of curvature or which are taken into account and evaluated by the program running in the ECU when updating the radius of curvature are:

i. the length of time spent by the objects moving in the area detected by the sensor in front of the motor vehicle, ii. the speed in the direction of travel of one's own motor vehicle of the objects moving in the area detected in front of the motor vehicle and/or iii. the distance of the objects moving in the area detected in front of the motor vehicle from one's own vehicle.

With low speed of one's own motor vehicle the radius of curvature is also reduced, as increased stability (low noise or constancy) of the signal reproducing the lateral position of the motor vehicle is achieved in this way. A (non-linear) reduction factor is preferably kept in a table for this.

The dimension by which changes in the bend radius are permissible is also dependent on the bend radius itself. With a very small bend radius a relatively high change rate is permitted. In particular in the case of exits to bends it is then achieved that on a straight stretch following the bend the correct lane of the motor vehicle traveling ahead which has been chosen as target motor vehicle—but also one's own lane—is soon found again.

The system according to the invention presets itself a width of own lane which is firstly dependent on the dimensions of the vehicle minus a safety allowance of approximately 0.2–0.7 meters on each side. On a straight stretch one's own lane would therefore have a substantially rectangular shape, the length of which—observed at any time—is slightly smaller than the reach of the radar sensor. This substantially rectangular lane is simulated in the ECU as a data structure. The width of the lane at close range (approximately 0–50 meters) and at long range (150+ meters) is fixed as smaller than in medium range (50–150 meters).

In order to keep the data structure in the ECU as effidently as possible, in the system according to the invention the width of one's own lane is fixed in the ECU only at those places in the area in front of one's own motor vehicle at which there are also objects in the detected area in front of one's own motor vehicle.

In the ECU the system modifies the width of one's own lane as a function of the distance away of detected objects in the area in front of one's own motor vehicle and the orientation of a bend in such a way that at a large distance away (150+ meters) the width decreases on the outside of the bend and the width at medium distance (50–150 meters) increases on the inside of the bend. This procedure reduces the selection of unfavourable objects as target motor vehicles "tracked" by one's own motor vehicle.

So that small lateral movements of the target motor vehicle to be tracked do not lead to these lateral movements being identified by the ECU as a change of lane of this motor vehicle, the width of one's own lane (and therefore also the lane of the target motor vehicle to be tracked) is widened in the ECU (ECU) towards both sides at the point where the target motor vehicle is located.

Similarly, one's own lane is widened in the ECU as a function of the time during which the driving behavior of one's own motor vehicle is dependent on the driving behavior of this target motor vehicle towards both sides at the point where the target motor vehicle is located.

Additionally or instead of the above measure for stabilising the driving behavior of one's own motor vehicle, the width of one's own lane can also be modified in the ECU as a function of the bendiness of the road on which one's own vehicle is located. In particular the width is reduced in this case if the road is very bendy. For this the radius of curvature at that moment and possibly also that of only a short time ago is evaluated in the ECU. If there is a small radius of curvature the width is reduced.

The same applies to the measure, likewise according to the invention, of modifying the width of one's own lane in the ECU, at least in sections, as a function of the speed of one's own motor vehicle. With a high speed of one's own vehicle the width of one's own lane is increased in order to avoid the target motor vehicle being "lost" from tracking owing even to small lateral movements of one's own or the tracked motor vehicle.

A further criterion in determining the optimum target vehicle traveling ahead, on the driving behavior of which the driving behavior of one's own motor vehicle is to be made dependent, is determining the lanes of the road on which one's own motor vehicle is moving. In this case demarcation markings of the lane are not looked for, as they are frequently not present. The behavior of the other objects moving in the area in front of one's own motor vehicle is instead evaluated in order to draw conclusions from this as to how many lanes the road has and on which of these lanes one's own motor vehicle is moving.

The system according to the invention keeps so-called lane lists for three lanes in the direction of travel of one's own motor vehicle and for three lanes in the opposite direction of travel. Basically, for each moving object from the object table in the ECU the chronological course of the lateral drift (in other words the lateral offset of the respective object in respect of the central axis of one's own motor vehicle and/or the course of the predicated lane) is evened out for this by low-pass filtering with a short time constant and then integrated.

In order to generate the lane lists from the object table and to keep them up-to-date, firstly one's own lane is determined. For this objects on the lateral edges of the detected area are given a low weighting factor and objects in the medium range of the area detected are given a higher weighting factor. Similarly, objects a long way away and very close objects with a large lateral drift are given a low weighting factor. All objects evaluated as low have in common that their exact lateral position can be determined only with difficulty and is also subject to great inaccuracy. Therefore they should have only very slight significance in determining lanes.

One's own lane is determined in the ECU from the thus weighted objects, incorporating the movements of one's own motor vehicle.

Using these results for the individual objects as a basis, moving objects are classified in the ECU as objects in one's own lane if an object further away than a minimum distance appears in one's own lane during a predetermined time frame for a length of time which has a relationship to the sum of the length of appearance in one or both the neighbouring lanes exceeding a threshold value dependent on the distance away of the object.

Starting from the above determining of the objects in one's own lane, the predetermined time frame can be modified in the ECU as a function of the speed of one's own motor vehicle to optimise and adjust the function to different marginal conditions and environments.

Moreover, the threshold value can be reduced in the ECU as the distance of the object from one's own motor vehicle becomes smaller.

Finally, moving objects detected in the area in front of one's own motor vehicle are classified in the ECU as objects located in the lane to the left or right of one's own if an object is located left of the left-hand demarcation of one's own lane or right of the right-hand demarcation of one's own lane at the corresponding distance away.

Lane allocation is likewise performed for the motor vehicles coming towards one, using the datum of their direction of travel and their respective lateral drift.

In general, according to the invention the length of time spent for of all objects for the lanes present in relation to one's own lane is determined and weighted over the time, wherein more recent appearances chronologically of objects in the lane of one's own vehicle are rated higher than appearances in the past and appearances of objects in the lane of one's own motor vehicle located at a spatial distance are rated lower than appearances located spatially closer. In this way it is achieved that safe determining of the objects as driving in one's own lane is performed. When selecting the target object behind which one has to "drive", this reduces the probability of a false choice.

From the lanes present in each case a maximum of two moving objects are now selected in the ECU and characterized as priority objects if they have been detected as moving in front of one's own motor vehicle for a period of time above a minimum value, this respective length of time of each object being weighted lower for objects located very close to one's own motor vehicle (c. 0–c. 30 m).

Therefore the number of candidates from which the target motor vehicle is selected is already greatly restricted. Moreover, these maximum six objects are those which are of pre-eminent significance for the driving behavior of one's own vehicle. Therefore in first approximation it is sufficient to observe these six objects in order to orientate the momentary driving behavior of one's own vehicle thereto. For each priority object it is determined in the ECU how far each priority object changes its lateral position relative to the centre line of the lane of one's own motor vehicle. The sum of the average values of the lateral changes in position of the priority objects is determined in this case as the change value of the lane of one's own motor vehicle at the respective distance from one's own motor vehicle.

In the ECU, from the priority objects the one, on the driving behavior of which the driving behavior of one's own motor vehicle is supposed to be dependent, is chosen as target motor vehicle, which i. is moving in the lane of one's own vehicle,
ii. has a direction of movement over ground which substantially coincides with the direction of movement of one's own motor vehicle and
iii. has already been detected for a predetermined length of time in the area in front of one's own vehicle.

The program running in the ECU preferably selects from the priority objects as target motor vehicle the one on the driving behavior of which the driving behavior of one's own motor vehicle is to be dependent, in which the cross speed relative to the centre line of one's own lane does not exceed a threshold value. For this the lateral drift for the individual objects from the target list is preferably differentiated according to the time. The threshold value can in this case be changed as a function of the distance of the respective object from one's own motor vehicle. These measures ensure that preferably a motor vehicle which has relatively steady driving behavior is selected as the target motor vehicle to be tracked. As a result of this there is also only a slight probability that this selected motor vehicle "gets lost from the sensor detection", which again leads to steadier driving behavior by one's own motor vehicle.

As a further improvement in detection safety, in particular to avoid mirror effects of the sensor beam (on the demarcation of the lane or on other—possibly moving—objects), a value reproducing the noise amplitude of the bearing angle for each of the objects is reserved by the ECU in the target list for each object and regularly updated. For all objects the chronological course of this value is smoothed out in the ECU by a low-pass. If the smoothed out value course for an object exceeds a threshold value dependent on distance away, this object is excluded from selection as target motor vehicle.

A further measure for increasing the stability of the system—in other words to avoid false selections—is that the ECU excludes a priority object from the target list from being selected as target motor vehicle if i. its distance from one's own motor vehicle is less than a distance threshold value and ii. the absolute value of the bearing angle to this priority object is greater than an angle threshold value (for example 4°) and iii. this priority object has not previously been chosen as target motor vehicle.

This ensures that an—unnecessary—change in target motor vehicle or jumping forwards and backwards between two (supposedly) "equally good" objects is avoided. This has the positive effect that an increase or decrease in the speed of one's own vehicle associated with the change to a new target motor vehicle is avoided.

The system according to the invention continually evaluates for the target motor vehicle the change in the bearing angle seen from one's own motor vehicle and also the rate of revolutions for one's own motor vehicle, in order to identify a change in lane of one's own motor vehicle. For this it is determined whether the change in the bearing angle to the target motor vehicle, on the driving behavior of which the driving behavior of one's own motor vehicle is supposed to be dependent, is above a certain threshold value and substantially equal to the rate of revolutions of one's own motor vehicle with inverse algebraic sign.

In order to identify whether one's own motor vehicle is driving on a bend, a variable related to the curvature of the lane of one's own motor vehicle is fed in the ECU as input signal in parallel to several low-pass filters with different time constants (low, preferably first order). The output signals of the low-pass filters and the input signal are compared with one another. If the (amplitudes of the) output signals have a respective minimum distance from one another and the output signal of a respective low-pass filter is smaller than the output signal of a low-pass filter with a smaller time constant and is larger than the output signal of a low-pass filter with a larger time constant or the output signal of a respective low-pass filter is larger than the output signal of a low-pass filter with a smaller time constant and is smaller than the output signal of a low-pass filter with a larger time constant, in the road course of one's own motor vehicle a transition from a bend of one orientation to a bend of the opposite orientation is identified. If the ECU has established that one's own motor vehicle is in a bend transition, for example an S-bend, the length of the evaluated lane is reduced, as in this situation different objects often change their lateral drift very greatly. If the evaluation length is reduced, objects in particular traveling at a greater distance in front of one's own motor vehicle are omitted from the observation. As the probability of an object traveling at a greater distance in front of one's own motor vehicle erroneously appearing in one's own lane is relatively high in a situation of this kind, the error ratio is lowered by reducing the evaluation length.

An essential aspect in identifying the environment is identifying the type of road. Identifying the type of road is of advantage in optimum coordination when selecting the target motor vehicle and controlling the speed of one's own motor vehicle. This is based on the realization that different types of road require coordination of individual system parameters (length and width of the evaluated lane(s), acceleration thresholds, etc.) differing considerably from one another in order to operate the system optimally, in other words in such a way that it corresponds as accurately as possible to the attitude of expectation of the driver.

The system according to the invention evaluates the speed of one's own motor vehicle, the number of identified lanes with the same direction of travel as that of one's own motor vehicle, the curvature of the lanes, etc. In order to implement this, according to the invention a characteristic value is determined which has flexible transitions and is defined as environmental speed. This characteristic value has the dimension speed (path/time).

To distinguish the type of road on which one's own motor vehicle is traveling, the system according to the invention determines characteristic values in the ECU for at least two different road environments (town traffic, country road, motorway), a variable influencing the respective characteristic value being the environmental speed determined from the speeds of the objects detected in the area in front of one's own motor vehicle and the speed of one's own motor vehicle, preferably decided by average value formation. The road environments have flexible limits, not rigid limit values.

All the time the value "environmental speed" is in the "motorway" range it is approximately 120 km/h–150 km/h. This applies even if the speed actually being driven at by the motor vehicle is momentarily lower or higher. In the "country road" range the value is approximately 60 km/h–100 km/h. In the "town traffic" range the value is approximately 30 km/h–50 km/h.

Based on a journey over a fairly long time at high speed for a fairly long time and with small steering turns, the ECU increases the value "environmental speed" in steps to such an extent that it comes into the "motorway" range (120 km/h–150 km/h). By means of a driving section with a bend radius and with a length as normally occurs at motorway exits and corresponding considerably reduced speed, the value "environmental speed" is brought back at a high rate to a value of, for example, 50 km/h–70 km/h, corresponding to the "country road" range, even if the speed being driven at momentarily is above this.

In the system according to the invention the value "environmental speed" is approximated in the ECU from a momentary amount to the speed actually being driven at by one's own motor vehicle via a predefined function (e.g. ramp, step). Preferably an approximation from a higher value than the momentary amount of the speed actually being driven at takes place at a first speed rate and an approximation from a lower value than the momentary amount of the speed actually being driven at a second, preferably considerably higher speed rate than the first. In this way it is ensured that drops in speed of short duration, for example on the motorway in the area of road-works or owing to a slower motor vehicle cutting in to the lane of one's own motor vehicle, do not cause an immediate drop back into the "country road" value range or even "town traffic".

The value "environmental speed" is further increased in the ECU via a predefined function (e.g. ramp, step), if there are at least two other objects substantially traveling side by side in front of one's own motor vehicle and one's own motor vehicle is driving at an actual speed which is in the "country road" range. An increase in the value "environmental speed" here takes place at a third, preferably considerably higher speed rate than the second. In particular an upper threshold value can be achieved here if a relatively high speed is achieved for a fairly long time on a multi-lane motor road outside a built-up area.

Moreover, the value "environmental speed" is reduced to a lower limit value via a predefined function (e.g. ramp, step) if side acceleration exceeding a threshold value were to result from the value "environmental speed" and the momentary rate of revolutions of one's own motor vehicle. In this case lowering of the value "environmental speed" takes place at a fourth, preferably considerably higher speed rate than the third. This ensures that on narrow bends lowering of the value "environmental speed" takes place very quickly.

Finally, the value "environmental speed" is limited to a predetermined multiple (e.g. 1.2) of the desired speed of the motor vehicle. This measure is based on the thought that if there is a change in the environment, for example from town traffic to country road or motorway, a change in the desired speed performed by the driver follows. Thus even in relatively fast traffic on multi-lane roads outside built-up areas the "motorway" speed level cannot be achieved without intervention by the driver.

The value "environmental speed" can adopt a maximum of a predetermined lower limit/threshold value and a predetermined upper limit/threshold value.

The course of curvature of the lane driven in by one's own motor vehicle is differentiated according to the path in the system according to the invention. As a function of the result a characteristic value "bendiness" is determined, which is not dependent on the speed of one's own motor vehicle.

The result of the differentiation of the course of curvature of the lane driven in by one's own vehicle is, moreover, evaluated in the ECU in order to reduce the characteristic value "bendiness" at a predetermined rate where there are long, straight sections of the lane over a certain stretch of route, as a function of the result.

The result of the differentiation of the course of curvature of the lane driven in by one's own motor vehicle is, moreover, evaluated in the ECU, in order to increase the characteristic value "bendiness" at a predetermined rate on S-bends (two bend sections running in opposite directions without a straight piece in between), as a function of the result.

In the system according to the invention the characteristic value "bendiness" is increased by a dynamic proportion at a high rate in the ECU if a signal is present which reproduces a curvature in the lane of one's own motor vehicle above a first predetermined value and, if there is no rate of revolutions signal above a second predetermined value, the dynamic portion is brought back again. In this way, in particular for driving on bends with a small bend radius, a quick reduction in the value "environmental speed" is achieved, without this leading to leaving the "motorway" range for the value "environmental speed", for example, when driving past motorway intersections or motorway interchanges.

In order to further improve the reduction in false target selection, in the system according to the invention in the ECU the dynamic portion is, furthermore, added to the value "bendiness" or subtracted from it again in right-hand drive traffic for right-hand bends only and in left-hand drive traffic for left-hand bends only.

Preferably the dynamic portion is modified in the ECU depending on the average curvature of the lane and the change in direction of travel since entering the bend. Entering the bend is here defined as the time at which the curvature signal exceeds the first predetermined threshold value. The change in direction of travel results from the integral of the yaw rate of the motor vehicle over the time.

In selecting the target motor vehicle there is the problem that aspired detection as early as possible of possible target objects, though it leads to increased stability or calm in "following" this target motor vehicle already detected a long way in front of one's own motor vehicle, in particular in the case of bendy motorways the danger also increases that a false target motor vehicle will be selected which is not actually in one's own lane. The invention therefore provides a procedure which allows an estimation of how susceptible the current target selection is to false selection owing to the environmental situation.

In the system according to the invention, as a function of the bendiness value those of the priority objects which are further away from one's own motor vehicle than others are excluded from selection as target motor vehicle.

In order to configure the selection of priority objects as accurately and efficiently as possible, it is of advantage if the system has available the information as to whether one's own vehicle is moving in an environment of left-hand drive or right-hand drive traffic. Starting from this, asymmetrication of the selection can be performed. According to the invention, based on this information, motor vehicles in the "slower" or "faster" lane than one's own are excluded from selection, as "false priority targets", rather than others located in one's own lane. Moreover, according to the invention, after cutting in to the "faster" lane, a higher acceleration is performed, etc.

For this, according to the invention during an (active or passive) overtaking process it is determined on which side the overtaking motor vehicle is located during overtaking. For this the speed of motor vehicles traveling in front of one's own motor vehicle in the lanes present is determined in the ECU and from this a characteristic value derived which indicates whether one's own motor vehicle is in left-hand or right-hand drive traffic.

For this the stretch covered by a predetermined number of the vehicles traveling in front of one's own motor vehicle in the lanes present or a variable correlated thereto is determined and related to the corresponding variable for one's own motor vehicle, in that the characteristic value is determined as the sum of the differences in the speeds of the motor vehicles of a first, preferably the left-hand, lane and the speeds of the vehicles of a second, preferably the right-hand, lane.

To increase safety during identification, an upper threshold value and a lower threshold value are determined, wherein the ECU generates and stores a signal "right-hand drive traffic" if the characteristic value exceeds the upper threshold value and the ECU generates and stores a signal "left-hand drive traffic" if the characteristic value goes below the lower threshold value.

Preferably only speeds of motor vehicles which exceed a predetermined threshold value are taken into account. This avoids false evaluations owing to convoy traffic or in built-up areas.

In order to avoid errors in allocating lanes, motor vehicles traveling in front of one's own motor vehicle are evaluated only if the radius of the lane exceeds a predetermined threshold value.

To further increase the safety of selection, additionally to or instead of evaluation of the speeds of the motor vehicles in the same direction of travel as one's own motor vehicle, determination of on which side of one's own motor vehicle there are motor vehicles going in the opposite direction of travel can also be used. For this, for motor vehicles with a negative relative speed to the speed of one's own vehicle, the amount of which is greater than the speed of one's own motor vehicle, the algebraic sign of the respective characteristic value is inverted in the control unit before adding up.

For motor vehicles with a negative relative speed to the speed of one's own motor vehicle, the amount of which is greater than the speed of one's own motor vehicle, the characteristic value can in this case be provided with a weighting factor.

As the detection area in front of one's own motor vehicle, as explained above, substantially widens out in the shape of a cone in front of the front part of the motor vehicle symmetrically to its central longitudinal axis with a relatively narrow aperture, "loss" of the target motor vehicle may occur on narrow bends.

Immediately after the loss of the target motor vehicle it may then occur that the speed of one's own motor vehicle is increased by the ECU. This results in the motor vehicle driving towards a bend situation at increased speed or accelerating on the bend. Consequently the driver must intervene and brake. To avoid this, according to the invention, if it is established that a target motor vehicle is leaving the detection area in front of one's own motor vehicle, a trigger signal is generated in the ECU which limits the momentary speed or the momentary acceleration of one's own motor vehicle, at least for a stretch, to a value substantially corresponding to a maximum of the distance X between one's own motor vehicle and the target motor vehicle at the time of its leaving the detection area.

In this way the speed of one's own motor vehicle remains constant or increases only minimally until one's own motor vehicle has also reached the bend or the place at which the target motor vehicle was "lost". This means a considerable gain in comfort and safety, as even on very bendy stretches hardly any or no braking interventions by the driver are required. The driver substantially just has to continue to steer, while the target motor vehicle supplies the appropriate default for the ECU in the driver's own motor vehicle by its hesitation before entering a bend or acceleration at the exit of a bend. The ECU appropriately bridges the period of time between "losing" and "re-finding" the target motor vehicle.

As the loss of the target motor vehicle usually happens only when it is already on the bend, in a preferred embodiment the distance X between one's own motor vehicle and the target motor vehicle at the point of leaving the detection area is reduced in the ECU by a shortening stretch DX to an effective distance Xeff. The shortening stretch DX should be changed depending on the environment (motorway, country road, town traffic), the speed of the target motor vehicle at the time of leaving the detection area, the momentary speed of one's own motor vehicle, the bend radii of bends already driven through in the past within a predetermined period of time, or similar.

The shortening stretch DX can also be determined from the average of the bend radii of bends already driven through in the past within a predetermined period of time.

The trigger signal contains information on or is characteristic of a maximum length of time resulting from the momentary speed of one's own motor vehicle and the distance X between one's own vehicle and the target motor vehicle at the time of its leaving the detection area or the effective distance Xeff.

To further increase selection safety of the target motor vehicle, determination can also be made as to whether an object located in the detection area in front of one's own motor vehicle goes below a predetermined distance and not in the lane of one's own motor vehicle is excluded from selection as a priority object. This strategy according to the invention allows for the circumstance that for targets a small distance away from one's own motor vehicle locating can no longer be done with the required accuracy. As objects of this kind are still detected via the so-called ancillary lobe of the radar sensor, it appears as if someone is cutting in to the lane of one's own motor vehicle from a neighboring lane.

Furthermore, an object which is located outside a predetermined angle to the central longitudinal axis of the sensor of one's own motor vehicle or exceeds a predetermined angle can be excluded from selection as a priority object.

The same applies to an object which has not been a target motor vehicle for a predetermined period of time in the past.

Other advantages of this invention will become apparent to those skilled in the art from the following detailed description of the preferred embodiment, when read in light of the accompanying drawings.

SHORT DESCRIPTION OF THE DRAWINGS

FIG. 1 shows a schematic block diagram of an embodiment of a system according to the invention for evaluating the driving environment of a motor vehicle;

FIG. 2 explains the relations of the individual physical variables detected by the radar sensor in the system according to the invention for evaluating the driving environment of a motor vehicle according to FIG. 1;

Figure 5:
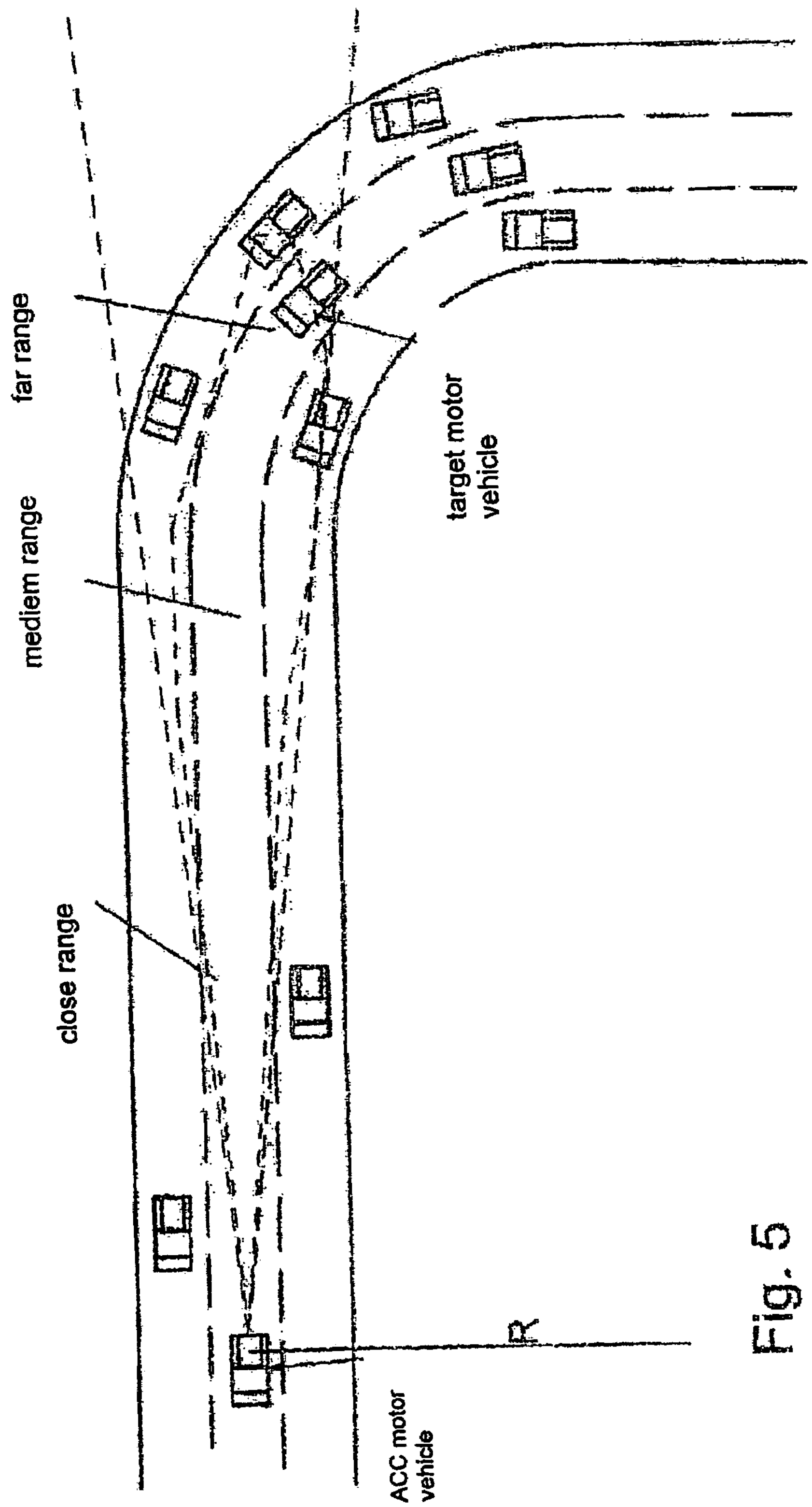
FIG. 5 depicts the situation of a motor vehicle with a system according to the invention for evaluating the driving environment of a motor vehicle on a multi-lane curved section of lane.
Figure 5A:
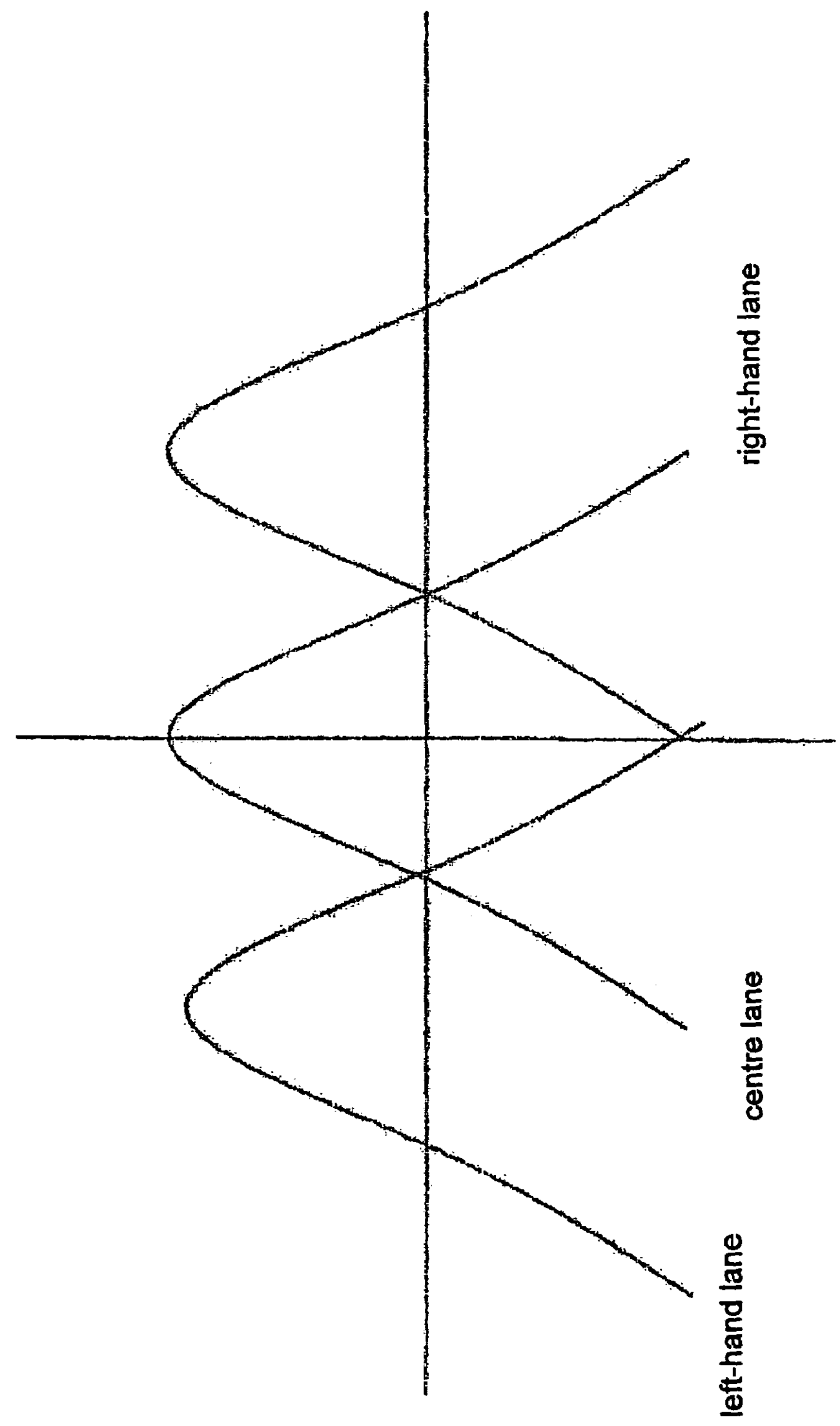
Figure 6:
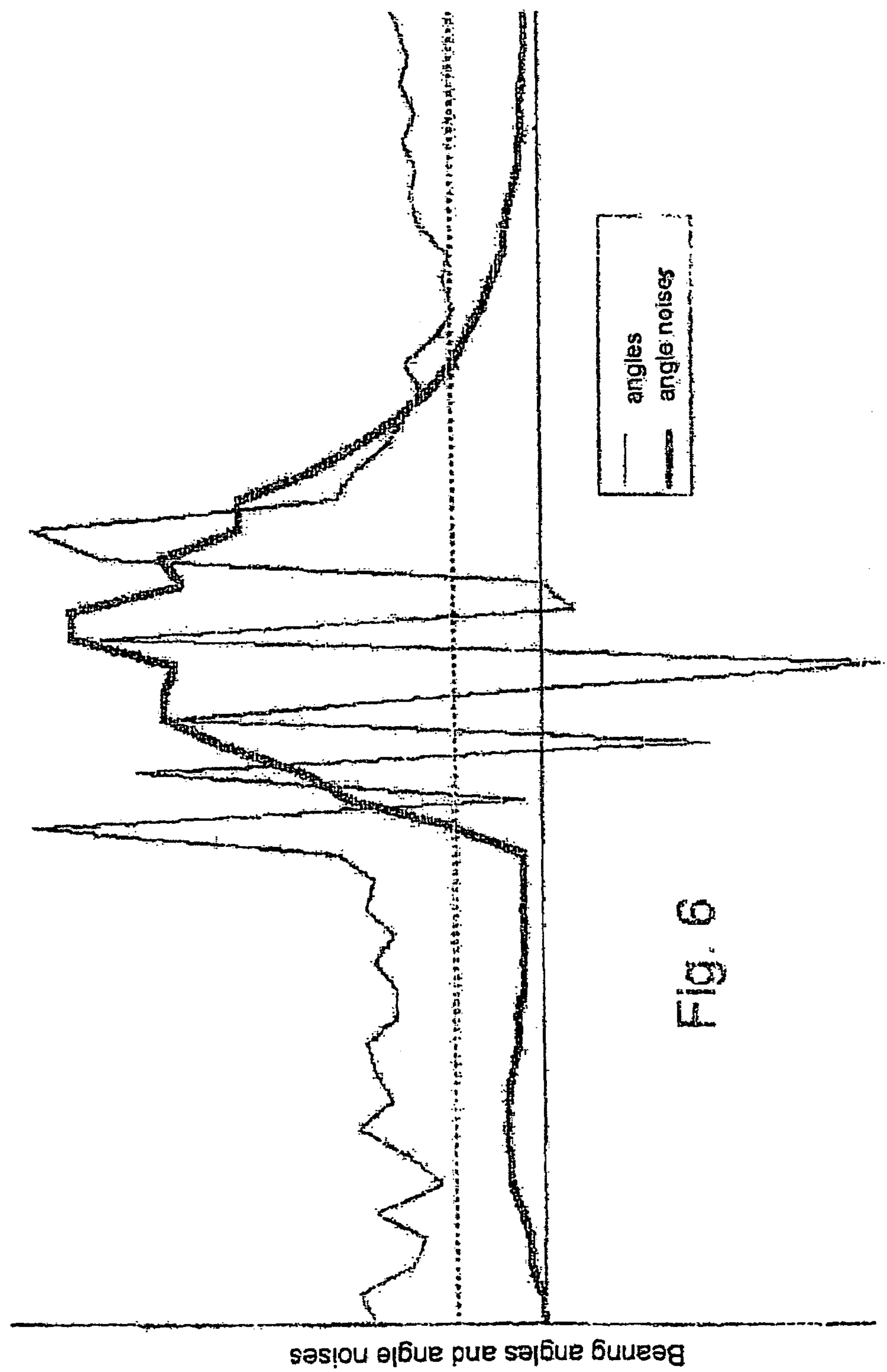
Figure 7:
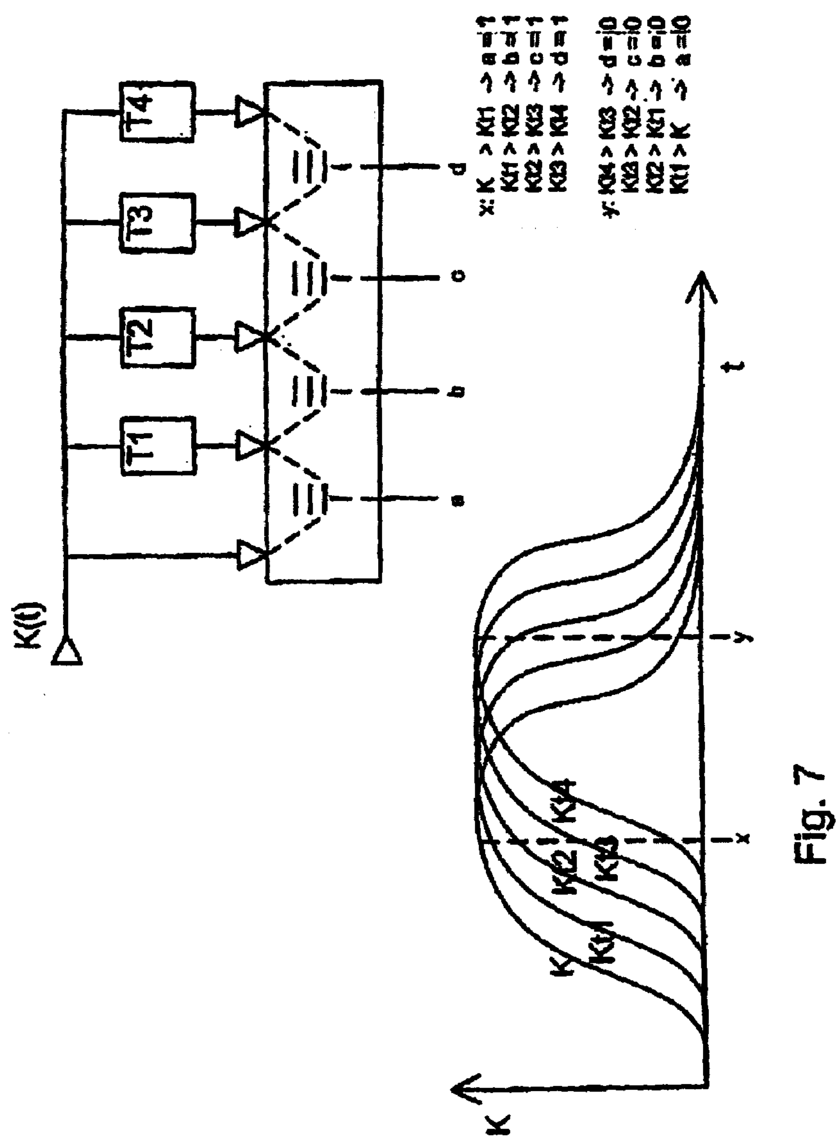
Figure 8:
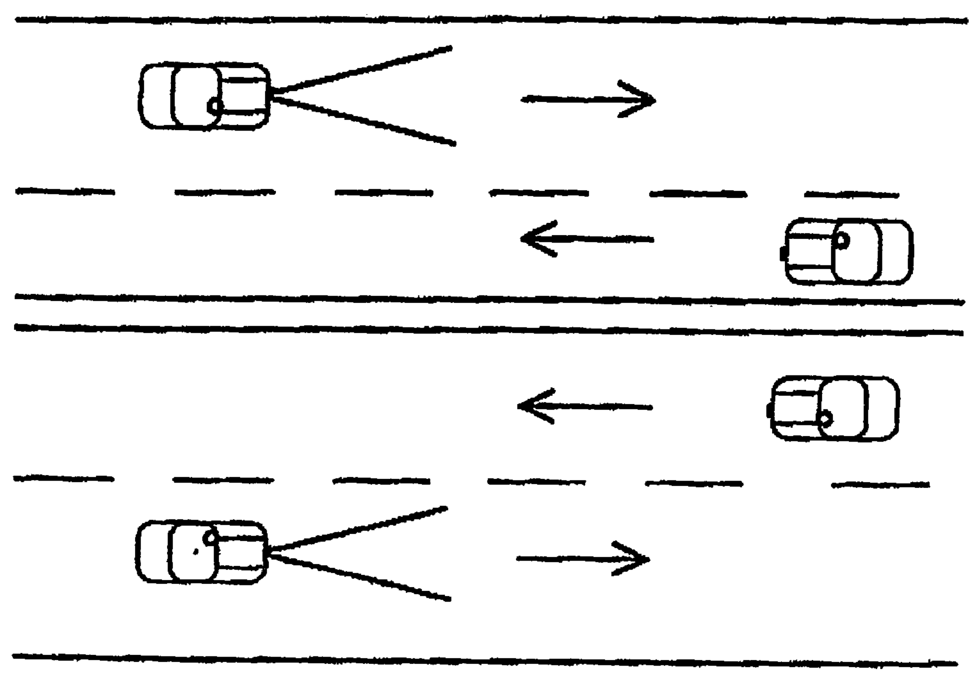
Figure 9:
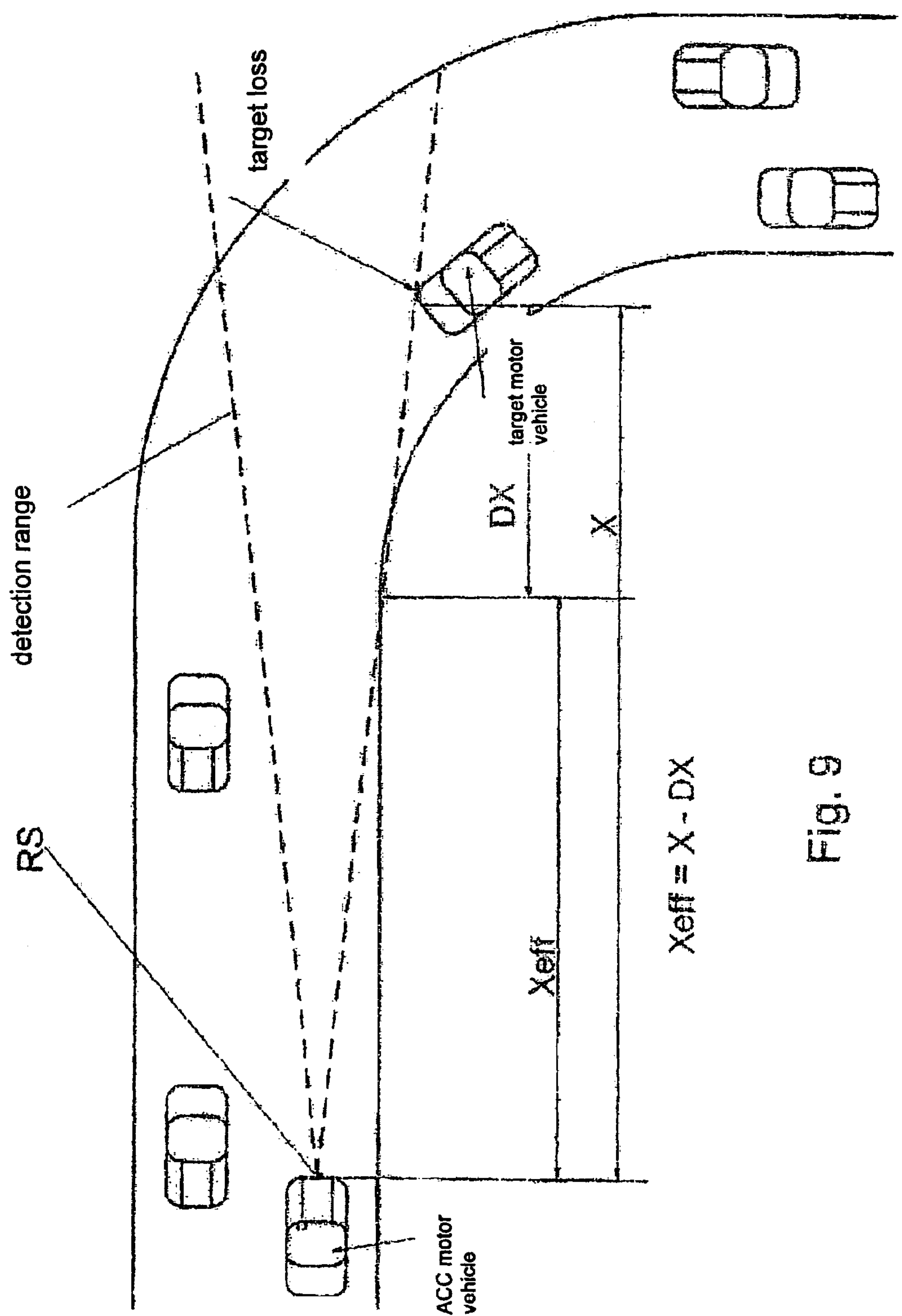

FIG. 5*a* shows the probability distribution that a motor vehicle will be encountered in a left-hand, central or right-hand lane;

FIG. 6 shows the noise amplitude of the bearing angle calculated for each of the objects;

FIG. 7 shows a schematic block diagram and its input and output signals for identifying left-hand or right-hand bends in a system according to the invention for evaluating the driving environment of a motor vehicle;

FIG. 8 shows the situation of a motor vehicle with a system according to the invention for evaluating the driving environment of a motor vehicle, while identifying whether the motor vehicle is moving in right-hand or left-hand drive traffic and FIG. 9 depicts the behavior of a motor vehicle with a system according to the invention for evaluating the driving environment of a motor vehicle on a curved section of lane when the target motor vehicle has been lost.

DETAILED DESCRIPTION OF THE INVENTION

Figure 1:
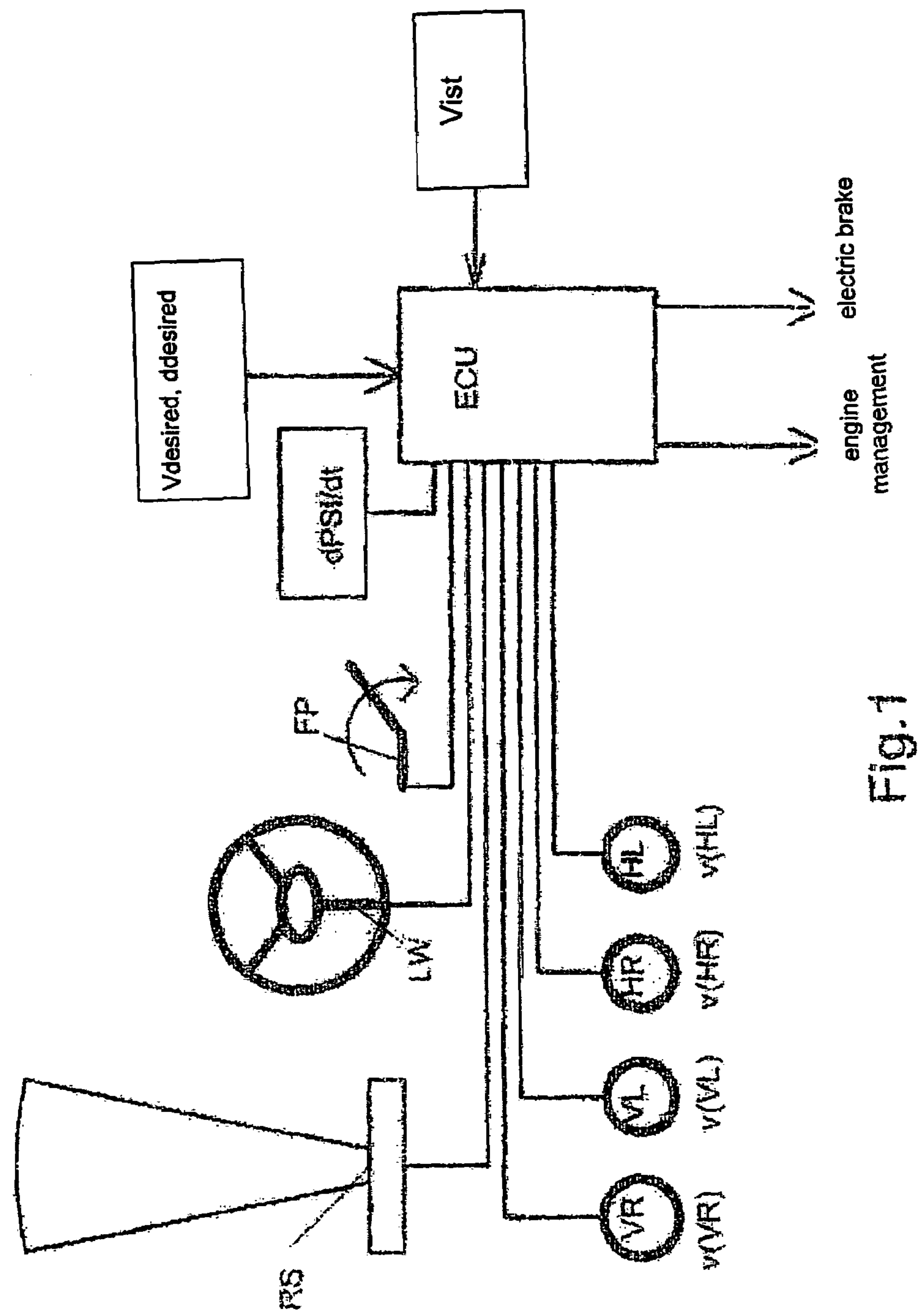

FIG. 1 shows an embodiment of a schematic block diagram of a system according to the invention for evaluating the driving environment of a motor vehicle and for influencing the speed of the motor vehicle. This system has an electronic control unit ECU, connected to a signal transmitter, which generates a signal characteristic of the desired speed Vdesired of the motor vehicle. The electronic control unit ECU further receives from a signal transmitter operating as a yaw rate sensor a signal characteristic of the rate of revolutions dPSI/dt of the motor vehicle about its vertical axis. Moreover, the electronic control unit ECU is connected to a signal transmitter operating as a radar sensor RS.

The radar sensor RS generates signals characteristic of objects located in the area in front of the motor vehicle in the direction of travel of the motor vehicle, which are fed to the electronic control unit ECU and therein further processed in a way described further below. Furthermore, the electronic control unit ECU receives from signal transmitters operating as wheel speed sensors, as also required, for example, for ABS operation, signals v(VL), v(VR), v(HL), v(HR) characteristic of the speed of the wheels VL, VR, HL, HR of the motor vehicle. Connected to the electronic control unit ECU as signal transmitter for the steering angle turn of the motor vehicle's steering wheel is an angle of rotation transmitter LW and as signal transmitter for the position of the accelerator pedal of the motor vehicle likewise an angle of rotation transmitter FP. The electronic control unit ECU is connected to control devices, having influence on the driving behavior of the motor vehicle, in the form of engine management or the electric or electrohydraulic braking system, in order to feed them output signals derived from the driving behavior of the motor vehicle in front of one's own motor vehicle and possibly the driving environment.

The radar sensor RS continually scans the area in front of the motor vehicle and generates signals characteristic of objects X located in the area in front of the motor vehicle in respect of their distance from and orientation to the motor vehicle. In particular the speed v_rel_X of the object X relative to the speed v of one's own motor vehicle, the distance d_x relative to one's own motor vehicle, the angle offset Alpha_x or the lateral drift relative to the vehicle longitudinal axis of one's own motor vehicle are continually detected and evaluated in the electronic control unit ECU (see FIG. 2).

Figure 2:
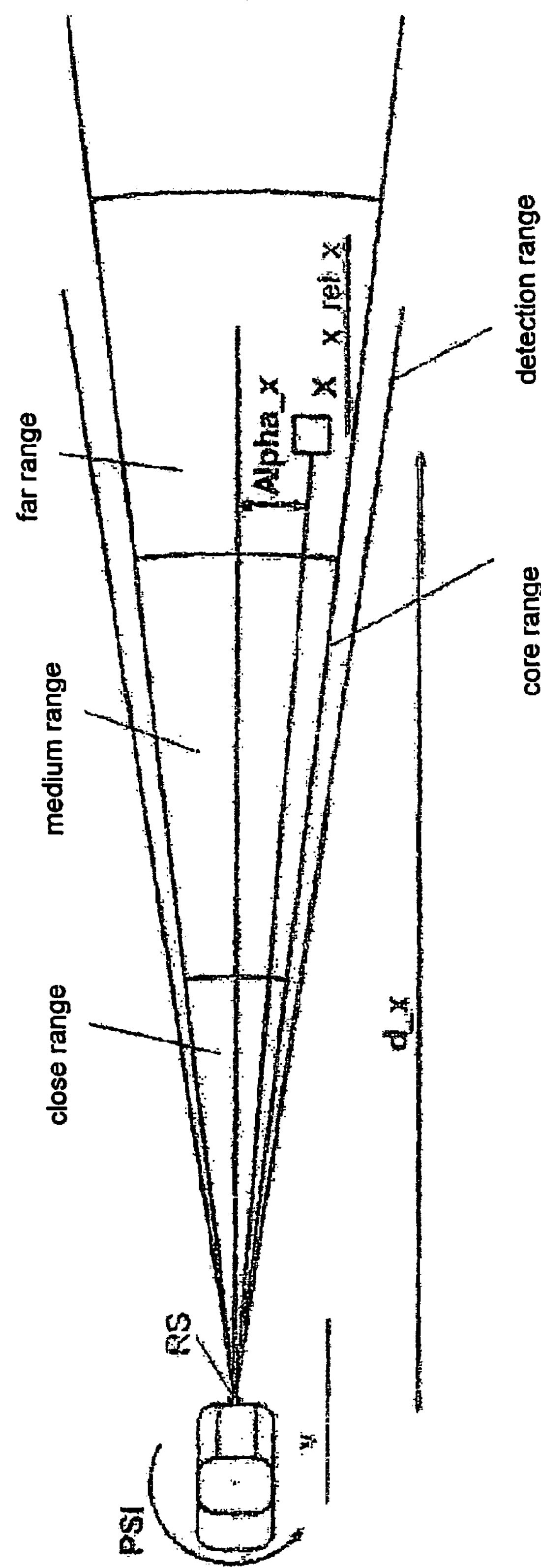

As illustrated in FIG. 2, the area scanned by the sensor in front of the motor vehicle is approximately conical or lobar and, depending on the actual environmental circumstances has a length of approximately 200–250 meters and an aperture of approximately 12°. To increase the safety of evaluation, however, only objects located in a core range of approximately 8–10° are observed. Safe detection can therefore take place for objects which are at a maximum distance of approximately 200+/−30 meters from one's own motor vehicle or are moving away in front of it within or below this range. This substantially rectangular lane is simulated in the electronic control unit ECU as a data structure and divided into a close range (for example approximately 0–50 meters), a far range (for example 150+ meters) and a medium range (for example 50–150 meters).

The data signals may in this case come from special sensors provided in the motor vehicle for the system according to the invention or from sensors also provided for other motor vehicle systems (braking control, "electronic steering wheel", EPS, or similar) and feed their data into a bus system (for example CAN-BUS) provided in the motor vehicle.

Figure 3:
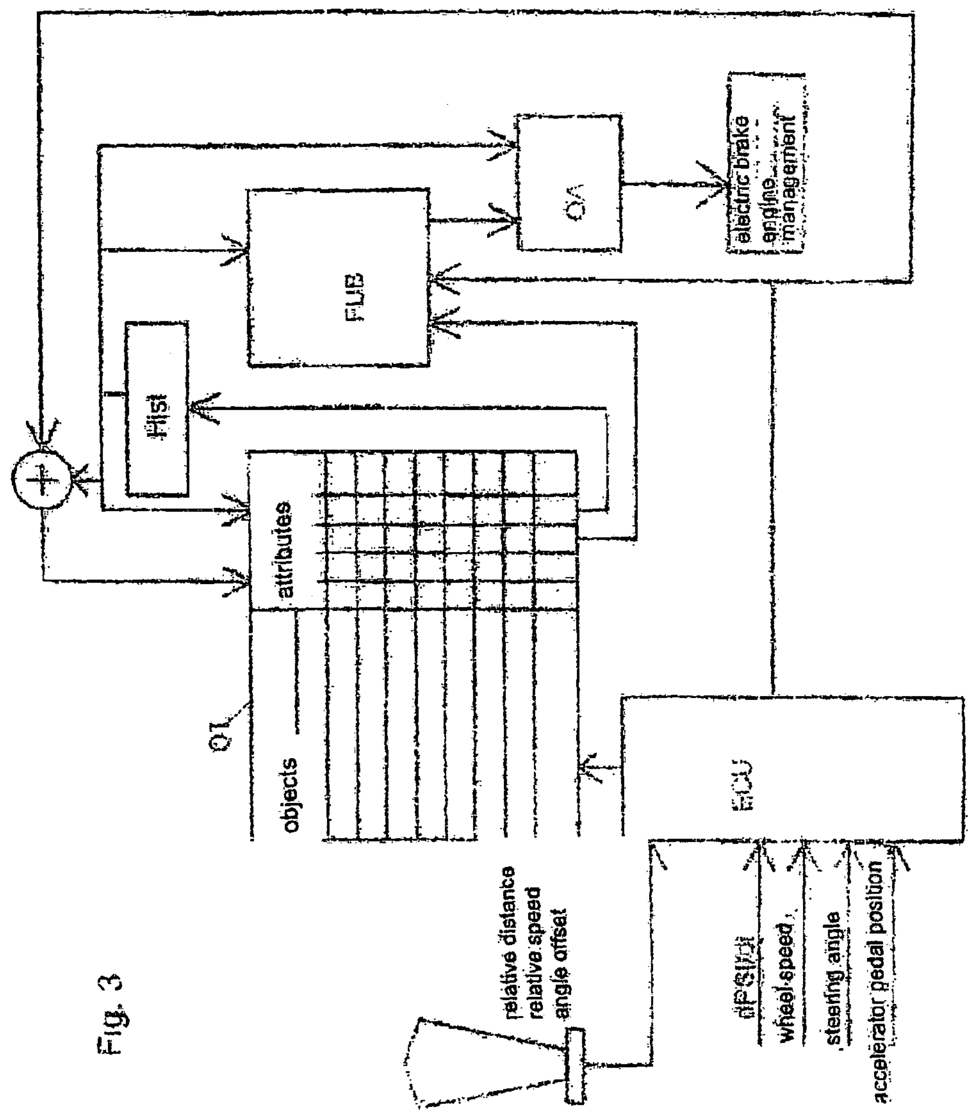
FIG. 3 depicts how the system according to the invention according to FIG. 1 processes the received data signals from the different sensors.
Figure 4:
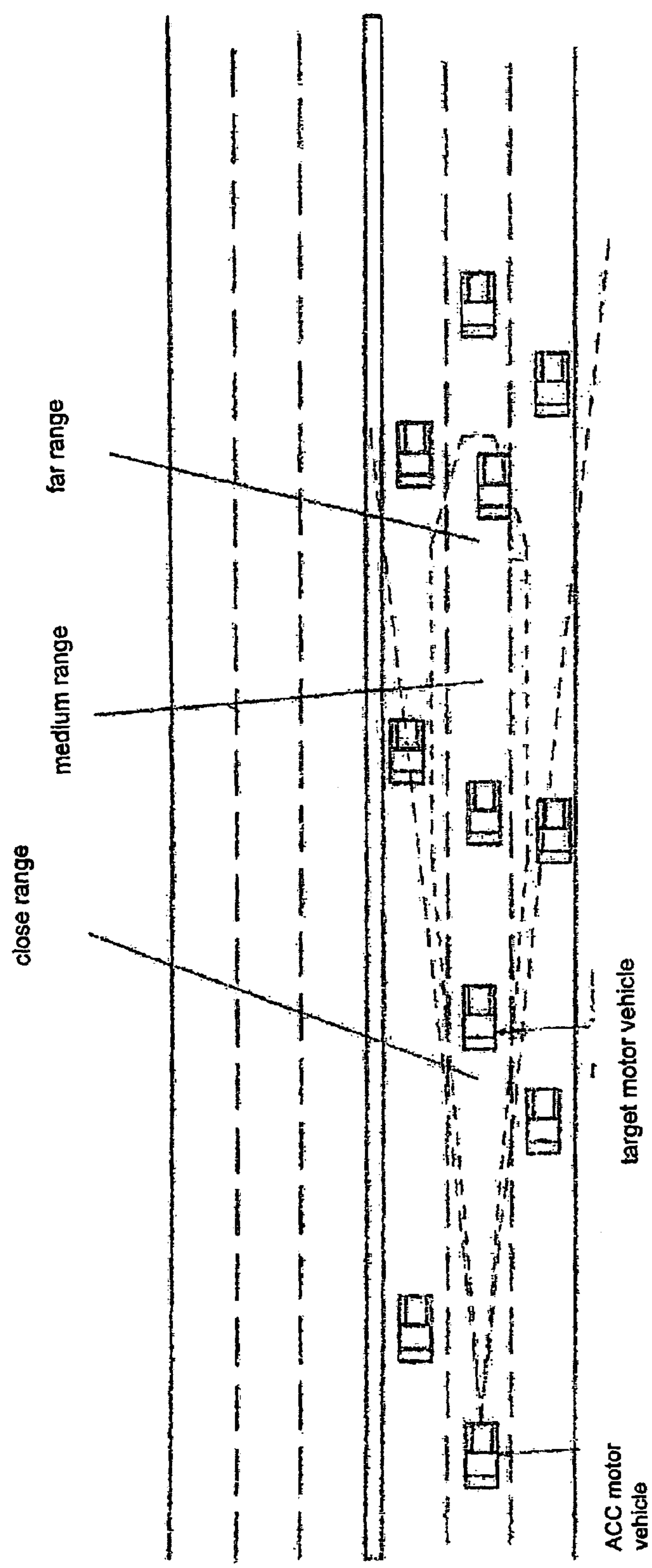
FIG. 4 depicts the situation of a motor vehicle with a system according to the invention for evaluating the driving environment of a motor vehicle on a multi-lane straight section of lane.

FIG. 3 depicts how the electronic control unit ECU processes the data signals received from the different sensors and generates data which are filed in tables or description objects and if necessary continually updated. A substantial part of the system according to the invention consists of an object table OT in which the objects located in the area in front of the motor vehicle (moving and possibly also static) are kept with their attributes (for example speed relative to the speed of one's own motor vehicle, the distance relative to one's own motor vehicle, the angle offset or the lateral drift relative to the vehicle longitudinal axis of one's own motor vehicle, how long a certain object has already been in the object table OT, how often it has performed a change of lane, etc.), in other words their object descriptions. From the object table OT and its history HIST, in other words from object descriptions in the past, a vehicle environment description FUB (is the motor vehicle moving in left-hand or right-hand drive traffic, is it traveling on a motorway, a country road or in town traffic, how many lanes does the road being driven on currently by the motor vehicle have, in which lane is the motor vehicle at the moment, is the road being driven on by the motor vehicle at the moment bendy, if so to what extent, or does the road run in a straight line? etc.) is generated, from which, together with the history HIST of the object table OT and the current data in the object selection OA, an object is selected from the object table OT as target motor vehicle, which is drawn on as "motor vehicle traveling ahead", in order to adjust one's own driving behavior (speed vdesired, distance ddesired, etc.) to its driving behavior, as shown in FIG. 4.

To establish the centre line of one's own lane in the area detected in front of the motor vehicle, the radius of curvature R of the bend of the lane of the centre of gravity of one's own motor vehicle is modified in the electronic control unit ECU using the change in the angle bearing of the objects traveling ahead and the absolute position of the objects traveling ahead in respect of the momentarily predicated lane. In other words, the distance in respect of the momentary location in the lane, after covering which the radius of curvature R of the bend in the lane of the centre of gravity of one's own motor vehicle changes, is determined in the electronic control unit ECU for one's own motor vehicle. The dimension of the change is here determined from the change in the angle bearing of the objects traveling ahead or their absolute position in respect of the momentarily predicated lane. In other words "predictive driving" takes place, in which one's own motor vehicle can be prepared for when or at what distance from the momentary position a reduction in one's own speed is indicated, as the motor vehicles traveling ahead are—also—entering a bend situation.

In order to make as accurate a prediction as possible in this case, as to how the radius of curvature R of the bend in the lane of the centre of gravity of one's own motor vehicle changes, the lateral speeds of the objects moving in the area detected in front of the motor vehicle are evaluated in the electronic control unit ECU and filed in the object table OT as attributes and updated. The same method is used with the length of time spent by the objects moving in the area detected in front of the motor vehicle and their speed and distance in the direction of travel from one's own motor vehicle, in order to modify the radius of curvature R as a function of the length of time spent or its speed and/or distance from one's own motor vehicle.

In the vehicle environment description FUB (FIG. 3) the course and the width of the lane of one's own vehicle in the area located in front of it are additionally filed as a description and updated. As depicted in FIGS. 4 and 5, in the vehicle environment description FUB the width of one's own lane is modified in the electronic control unit ECU depending on the distance from one's own motor vehicle, the maximum width in close range and in far range being less than in medium range. The width of one's own lane is fixed in the electronic control unit only at those points in the area in front of one's own motor vehicle at which there are also objects in the area detected in front of one's own motor vehicle.

As likewise depicted in FIGS. 4, 5, in the vehicle environment description (FIG. 2) the width of one's own lane is modified in the electronic control unit ECU as a function of the distance away of detected objects in the area in front of one's own motor vehicle and the orientation of a bend, in such a way that at a great distance the width on the outside of the bend decreases and the width in the medium distance increases on the inside of the bend. Moreover, the width of one's own lane can be widened in the electronic control towards both sides at the point where there is a target motor vehicle, on the driving behavior of which the driving behavior of one's own vehicle is supposed to depend.

Furthermore, in the vehicle environment description FUB one's own lane is widened towards both sides by the electronic control unit ECU as a function of the length of time in which the driving behavior of one's own motor vehicle is dependent on the driving behavior of this target motor vehicle at the point where the target motor vehicle is located (see FIG. 5). In a corresponding way the width of one's own lane is modified in the electronic control unit (ECU) as a function of the speed of one's own motor vehicle and/or the bendiness of the road on which one's own motor vehicle is located. A procedure according to the invention for determining the bendiness is explained further below.

A further feature which plays a role in the selection of an object as target motor vehicle is its lane. The objects located in the area in front of one's own motor vehicle are classified for this in respect of their momentary position compared with the width of the lane at an appropriate distance from one's own motor vehicle. Moving objects detected in front of one's own vehicle are classified in the electronic control unit ECU as objects in one's own lane, if an object further away than a minimum distance has a length of appearance in one's own lane during a predetermined time frame, which has a relation to the sum of the length of appearance in one or both neighboring lanes exceeding a threshold value. In this case this object is filed with the corresponding attributes in the object table OT. The classification of a motor vehicle as belonging to the centre lane, for example,—in which one's own motor vehicle is also located—assumes that it is within the corridor for the momentary distance of the motor vehicle with the corresponding width. If it is driving on the left outside the corridor limiting one's own lane, it is classified as driving in the left-hand lane; if it is driving on the right outside the corridor limiting one's own lane, it is classified as driving in the right-hand lane (see for example FIG. 5). In FIG. 5*a* is depicted with what probability distribution a motor vehicle is to be encountered in a left-hand, centre or right-hand lane. A corresponding value is filed in the object table OT and updated for each of the objects.

The predetermined time frame can in this case be modified in the electronic control unit ECU as a function of the speed of one's own motor vehicle and filed in the object table OT.

Moreover, the threshold value can be reduced in the electronic control unit ECU as the distance of the object from one's own vehicle grows smaller.

Furthermore, the length of time spent by all objects for the lanes present in relation to one's own lane is determined and weighted over the time. This is filed in the object table OT as an attribute. Chronologically more recent appearances of objects in the lane of one's own motor vehicle are valued higher than appearances in the past and appearances which are spatially far away of objects in the lane of one's own motor vehicle are valued lower than spatially closer appearances.

From the lanes present in each case a maximum of two moving objects are selected in each case by the electronic control unit ECU as priority objects in the object table OT and provided with appropriate marking as an attribute in the object table OT, if they have been detected as moving in front of one's own vehicle for a time frame above a minimum value. This respective length of time is weighted lower for objects located very close to one's own vehicle (0–30 m) and very far from one's own motor vehicle (120–200 m) and higher for objects in between.

For each priority object in the object table OT characterized in this way it is determined by the electronic control unit ECU how far each priority object changes its lateral position relative to the centre line of the lane of one's own vehicle. The sum of the average values of the lateral changes in position of the priority objects are determined by the electronic control unit ECU as the change value of the lane of one's own motor vehicle at the respective distance from one's own vehicle and likewise filed in the object table OT.

By object selection OA (FIG. 4), from the priority objects the one, on the behavior of which the behavior of one's own motor vehicle is supposed to depend, which is moving in the lane of one's own vehicle, has a direction of movement over ground substantially coinciding with the direction of movement of one's own vehicle and has been detected in the area in front of one's own motor vehicle for a predetermined length of time read out from the object table OT and its history HIST, is selected in the electronic control unit ECU as target motor vehicle.

The cross speed relative to the centre line of one's own lane is also kept and updated in the object table OT for each of the priority objects. This also allows selection of the target motor vehicle according to the criterion that this cross speed does not exceed a threshold value, possibly also changeable as a function of the distance of the respective object from one's own vehicle.

Furthermore, as shown in FIG. 6, the noise amplitude of the bearing angle in respect of the central longitudinal axis of one's own motor vehicle is recorded as an attribute in the object table OT for each of the objects selected as priority objects and possibly also added to the history HIST. It is therefore possible to evaluate the chronological course of the noise amplitude of the bearing angle for each of the priority objects in the electronic control unit ECU. According to the invention the noise signal is low-pass filtered to cut out short angle deflections. If a threshold value dependent on distance is exceeded, this priority object is excluded from selection as target motor vehicle, on the driving behavior of which the driving behavior of one's own motor vehicle is supposed to depend.

Similarly, a priority object, on the driving behavior of which the driving behavior of one's own vehicle is supposed to depend, is excluded from selection as target motor vehicle if its distance from one's own vehicle is greater than a distance threshold value (for example 4°) and this priority object has not previously been selected as target motor vehicle. The continuous recording of the noise amplitude of the bearing angle in respect of the central longitudinal axis of one's own motor vehicle as an attribute in the object table OT for each of the objects selected as priority objects and possibly adding them to the history HIST is very useful for this too.

In the electronic control unit ECU a change in lane of one's own motor vehicle is identified from the fact that the change in the bearing angle to the target motor vehicle, on the driving behavior of which the driving behavior of one's own motor vehicle is supposed to depend, exceeds a certain threshold value and substantially equals the rate of revolutions of one's own vehicle with inverse algebraic sign. The rate of revolutions of one's own motor vehicle can be derived from the signal of the yaw rate sensor (see FIG. 1) which delivers a signal characteristic of the rate of revolutions dPSI/dt of the motor vehicle about its vertical axis. The continuous recording of the bearing angle of the target motor vehicle in respect of the central longitudinal axis of one's own motor vehicle and its noise amplitude as an attribute in the object table OT and adding it to the history HIST is also required for this evaluation.

As shown in FIG. 7, a variable K(t) related to the curvature of the lane of one's own motor vehicle is fed in the electronic control unit ECU as input signal in parallel to several low-pass filters T1, T2, T3, T4 of the first order with different time constants. This variable may be, for example, the bend radius determined in the way described above or its reciprocal value or the rate of revolutions of the vehicle.

The output signals of the low-pass filters and the input signal are compared with one another in each case, in order to identify a transition from a bend of one orientation to a bend of opposite orientation in the course of the road of one's own vehicle. This takes place in the electronic control unit ECU in that if the output signals are at a respective minimum distance from one another and the output signal of a respective low-pass filter is smaller than the output signal of a low-pass filter with a smaller time constant and larger than the output signal of a low-pass filter with a larger time constant or the output signal of a respective low-pass filter is larger than the output signal of a low-pass filter with a smaller time constant and smaller than the output signal of a low-pass filter with a larger time constant a transition is identified.

In FIG. 7 this is depicted in that the four comparisons used in the example are carried out at two time points X, Y. If the individual results (output signals a, b, c, d) of the four comparisons of 1, 1, 1, 1 change in succession to 0, 0, 0, 0, it can be derived from this that a bend transition has taken place.

A further aspect of the system according to the invention is to establish in what environment one's own motor vehicle is at that time. For this a value "environmental speed" is kept in the vehicle environment description FUB the electronic control unit ECU (see FIG. 2) and regularly updated. To distinguish the type of road on which one's own motor vehicle is traveling, characteristic values with flexible limits are determined in the electronic control unit ECU for the three different road environments (town traffic, country road, motorway).

This value is approximated in steps from a momentary amount to the speed actually being driven at by one's own motor vehicle. The speed actually being driven at by one's own motor vehicle is derived from the accelerator pedal signal FP (see FIG. 1) or a tachometer signal (not further depicted). According to the invention an approximation from a higher value than the momentary amount of the speed actually being driven at takes place at a first speed rate and an approximation from a lower value than the momentary amount of the speed actually being driven at at a second speed rate considerably higher than the first.

Moreover, the value "environmental speed" is approximated in steps from a momentary amount to a value which is in the motorway range (for example 150 kmh), if there are at least two other objects traveling substantially side by side in front of one's own motor vehicle.

Furthermore, the value "environmental speed" is approximated in steps from a momentary amount to a lower threshold value. If a side acceleration where to emerge from the value "environmental speed" and the momentary rate of revolutions of one's own vehicle exceeding a threshold value, the value "environmental speed" is reduced at a fourth, considerably higher speed rate than the third until this side acceleration no longer exceeds the threshold value.

Finally, the value "environmental speed" is limited to a predeterminable multiple (for example 0.5–1.5) of the desired speed of one's own motor vehicle and to a predeterminable lower threshold value (for example 40 kmh) and a predeterminable upper threshold value (for example 160 kmh).

The value "environmental speed" is important for the functioning of the system according to the invention in many respects, as it has influence on other parameters or is drawn on to determine, modify or update them. On the other hand, further variables derived from the driving behavior of one's own or other people's motor vehicles, which allow conclusions to be drawn on the environment, also have an influence on these parameters. One of these derived variables is the course of curvature of the road on which one's own motor vehicle is located at the time; expressed mathematically, this is the course of the reciprocal value of the bend radius over the path. According to the invention this course of curvature is differentiated according to the path. As a function of the result a characteristic value "bendiness" is determined.

Depending on the result of the differentiation of the course of curvature according to the path, in a succession of bend changes over a certain distance the "bendiness" is changed at a predetermined rate dependent on the speed of one's own motor vehicle and/or the distance from the target motor vehicle.

In the electronic control unit ECU the course of curvature is additionally differentiated according to the path and in the case of long straight sections over a certain distance reduced as a function of the result of the value "bendiness" at a predetermined rate, preferably dependent on the speed of one's own vehicle and/or the distance from the target motor vehicle and/or the length of the straight section.

Similarly, if driving through an S-bend is identified, in other words two bend sections running in opposite directions without or with only a relatively short straight intermediate piece, the value "bendiness" is increased at a higher rate as a function of the result.

A further factor influencing the value "bendiness" is the integral of the rate of revolutions signal dPSI/dt of the motor vehicle about its vertical axis, which reproduces the change in direction of one's own vehicle over the path. As a function of this, the value "bendiness" is increased by a dynamic portion at a high rate. If there is no rate of revolutions signal above a predetermined value, the dynamic portion is brought back again—to the previous value.

The system according to the invention here provides to add the dynamic portion to the value "bendiness" or subtract it from it again in right-hand drive traffic for right-hand bends only and in left-hand drive traffic for left-hand bends only. The manner in which right-hand drive traffic or left-hand drive traffic is identified is described further below. The dynamic portion is, moreover, modified dependent on the speed of one's own vehicle.

As a function of the thus determined "bendiness" the geometry of the driving corridor for selecting the target relevant for control is adjusted (e.g. shortened) to the effect that incorrect target selection in bend transitions is avoided.

Similarly, in the selection as target motor vehicle those which "drift forwards and backwards" relatively little are preferred.

A further criterion in selecting a priority object is that an object which is located in the detection area in front of one's own vehicle, goes below a predetermined distance and is not in the lane of one's own vehicle is excluded from selection as priority object.

An object which is located outside a predetermined angle to the central longitudinal axis of one's own vehicle or exceeds a predetermined angle is also excluded from selection as a priority object.

To identify left-hand or right-hand drive traffic, for vehicles traveling in the lanes present in front of one's own motor vehicle their speed is determined in the electronic control unit ECU and from this a characteristic value derived which indicates whether one's own motor vehicle is in left-hand or right-hand drive traffic. This is depicted in FIG. 8, wherein in FIG. 8 at the top a left-hand drive traffic situation (as for example in Great Britain or Japan) and in FIG. 8 at the bottom a right-hand drive traffic situation is shown (as for example in continental Europe or the USA).

In order to identify where one's own motor vehicle is located, the stretch covered by a predetermined number of the motor vehicles traveling in the lanes present in front of one's own motor vehicle or a variable correlated therewith is determined and related to the corresponding variable for one's own motor vehicle. For this the characteristic value is determined as an integral of the differential speeds of the motor vehicles of a first, preferably the left-hand, lane and the differential speeds of the motor vehicles of a second, preferably the right-hand, lane, in relation to the speed of one's own vehicle. To increase safety of identification an upper threshold value and a lower threshold value are determined, the electronic control unit ECU generating a signal "right-hand drive traffic" and storing it in the vehicle environment description FUB if the characteristic value exceeds the upper threshold value and generating a signal "left-hand drive traffic" and storing it in the vehicle environment description FUB if the characteristic value goes below the lower threshold value.

For identifying left-hand and right-hand drive traffic only speeds of motor vehicles which exceed a predetermined threshold value (for example 10 km/h) are taken into account. Moreover, to identify left-hand or right-hand drive traffic motor vehicles traveling in front of one's own vehicle are evaluated only if the radius of the lane exceeds a predetermined threshold value (for example 25–50 m).

In evaluating for identification of left-hand or right-hand drive traffic, characteristic values of motor vehicles with a negative relative speed to the speed of one's own motor vehicle, the amount of which is greater than the speed of one's own motor vehicle, are provided with a weighting factor. Via the weighting factor it is fixed to what extent traffic going in the opposite direction is taken into account, the relative speed for vehicles identified as traffic traveling in the opposite direction being regarded as negated.

A further functionality of the system according to the invention is explained below with reference to FIG. 9. If a target motor vehicle leaves the detection area in front of one's own vehicle, a trigger signal is generated in the electronic control unit ECU, which limits the momentary speed or the momentary acceleration of one's own motor vehicle at least for a stretch to a value corresponding substantially to a maximum of the distance X between one's own motor vehicle and the target motor vehicle at the time of its leaving the detection area.

The distance X between one's own motor vehicle and the target motor vehicle is continually detected for this. If the target motor vehicle leaves the detection area of the radar sensor RS of one's own motor vehicle, at the time of leaving the detection area there is a reduction by a shortening stretch DX to an effective distance Xeff. This shortening stretch DX is dependent on the environment (motorway, country road, town traffic), the speed of the target motor vehicle at the time of leaving the detection area, the momentary speed of one's own motor vehicle, the bend radii of bends already driven through in the past within a predetermined period of time, or similar.

As the target motor vehicle "disappears" in front of one's own motor vehicle when it enters a bend, while one's own motor vehicle is still driving straight ahead, this would result for one's own vehicle in the ACC system increasing the speed. In this way the speed for entering the bend might be too high, so the driver would have to brake sharply. The functionality according to the invention prevents this effect in that a trigger signal is generated which prevents this increase in speed for a predetermined length of time. The trigger signal is here characteristic of a maximum period of time—and is output for a corresponding length of time—resulting from the momentary speed of one's own motor vehicle and the distance X between one's own motor vehicle and the target motor vehicle at the time of leaving the detection area or the effective distance Xeff.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. System for evaluating a driving environment of a motor vehicle and for influencing a speed of the motor vehicle in its own lane, comprising:

- an electronic control unit (ECU), which is connected to:
  - a signal generator generating a signal which is characteristic of a desired speed of the motor vehicle,
  - a signal generator generating a signal which is characteristic of a yaw rate of the motor vehicle about its vertical axis,
  - a signal generator which generates, for objects located in a space lying in front of the motor vehicle in its direction of travel, a signal which is characteristic of a distance and orientation of the objects with respect to the motor vehicle and which reproduces at least one of:
    - a speed relative to the speed of the motor vehicle,
    - a distance relative to the motor vehicle, and
    - an angular offset or a lateral deviation relative to a vehicle longitudinal axis of the motor vehicle, and
  - a signal generator generating a signal which is characteristic of a speed at least of one wheel of the motor vehicle;
- wherein the electronic control unit (ECU) is connected to at least one control device for influencing road behavior of the motor vehicle in order to supply said at least one control device with output signals which are derived from road behavior of a target motor vehicle located in front of the motor vehicle, whereby characteristic values having fluid boundaries are established in the electronic control unit (ECU) for at least two different road environments (town traffic, country road, highway) in order to distinguish the type of road on which the motor vehicle is traveling, wherein a quantity influencing the respective characteristic value is the "environmental speed" established from the speeds of the objects detected in the space in front of the driver's motor vehicle.

2. System according to claim 1, wherein the "environmental speed" value of an instantaneous magnitude is approximated to a speed at which the motor vehicle is actually traveling via a predetermined function in the electronic control unit (ECU), wherein both an approximation of a value higher than an instantaneous magnitude of the speed at which the motor vehicle is actually traveling with a first speed and an approximation of a value lower than the instantaneous magnitude of the speed at which the motor vehicle is actually traveling with a second speed take place.

3. System according to claim 2, wherein when at least two other objects, substantially traveling side-by-side, are located in front of the motor vehicle and the motor vehicle is traveling at an actual speed which lies in the "country road" range, the "environmental speed" value is raised with a third speed.

4. System according to claim 3, wherein the "environmental speed" value of an instantaneous magnitude is approximated to a lower limit value in steps, in the electronic control unit (ECU), wherein, should a lateral acceleration which exceeds a threshold value result from the "environmental speed" value and an instantaneous yaw rate of the driver's motor vehicle, the "environmental speed" value is reduced to the threshold value with a fourth speed.

5. System according to claim 4, wherein the fourth speed is significantly higher than the third speed.

6. System according to claim 2, wherein the second speed is significantly higher than the first speed.

7. System according to claim 3, wherein the third speed is significantly higher than the second speed.

8. System according to claim 1, wherein the "environmental speed" value is limited to a predeterminable multiple of the desired speed of the motor vehicle in the electronic control unit (ECU).

9. System according to claim 1, wherein the "environmental speed" value is limited to a predeterminable lower threshold value and a predeterminable upper threshold value in the electronic control unit (ECU).

10. System according to claim 1, wherein a bend characteristic is differentiated in the electronic control unit (ECU) according to a path traveled and, according to the result, the "environmental speed" value is reduced with a predetermined rate.

11. System according to claim 10, wherein the predetermined rate depends on at least one of the speed of the motor vehicle and on the distance from the target motor vehicle.

12. System according to claim 1, wherein a bend characteristic is differentiated in the electronic control unit (ECU) according to a path traveled and, in the case of a sequence of bend changes over a certain distance, according to the result, the "environmental speed" value is reduced with a predetermined rate.

13. System according to claim 12, wherein the predetermined rate depends on at least one of the speed of the motor vehicle and on the distance from the target motor vehicle.

14. System according to claim 1, wherein a bend characteristic is differentiated in the electronic control unit (ECU) according to a path traveled and, in the case of long straight sections over a certain distance, according to the result, the "environmental speed" value is increased with a predetermined rate.

15. System according to claim 14, wherein the predetermined rate depends on at least one of the speed of the motor vehicle and on the distance from the target motor vehicle.

16. System according to claim 1, wherein a bend characteristic is differentiated in the electronic control unit (ECU) according to a path traveled and, in the case of double bends (two contradirectional bend sections without any or with just one relatively short straight intermediate stretch), according to the result, the "environmental speed" value is reduced with a high rate.

17. System according to claim 1, wherein, given a signal which reproduces a yaw rate lying above a predetermined value, the "environmental speed" value is reduced with a high rate by a dynamic component and, in the absence of the yaw rate signal lying above the predetermined value, the dynamic component is restored in the electronic control unit (ECU).

18. System according to claim 17, wherein, in the case of right-hand traffic, the dynamic component is only subtracted from the environmental speed or restored for right-hand bends and, in the case of left-hand traffic, the dynamic component is only subtracted from the environmental speed or restored for left-hand bends in the electronic control unit (ECU).

19. System according to claim 17, wherein the dynamic component is modified in the electronic control unit (ECU) according to at least one of the speed of the motor vehicle and the distance from the target motor vehicle.

20. System according to claim 1, wherein a bend characteristic is differentiated in the electronic control unit (ECU) according to a path traveled and, according to the result, the "environmental speed" value is reduced with a predetermined rate.

21. System according to claim 20, wherein the predetermined rate depends on at least one of the speed of the motor vehicle and the distance from the target motor vehicle.

22. System according to claim 1, wherein a bend characteristic is differentiated in the electronic control unit (ECU) according to a path traveled and, in the case of a sequence of bend changes over a certain distance, according to the result, the "environmental speed" value is reduced with a predetermined rate.

23. System according to claim 22, wherein the predetermined rate depends on at least one of the speed of the motor vehicle and the distance from the target motor vehicle.

24. System according to claim 1, wherein a bend characteristic is differentiated in the electronic control unit (ECU) according to a path traveled and, in the case of long straight sections over a certain distance, according to the result, the "environmental speed" value is increased with a predetermined rate.

25. System according to claim 24, wherein the predetermined rate depends on at least one of the speed of the motor vehicle and the distance from the target motor vehicle.

26. System according to claim 1, wherein the "environmental speed" is determined by averaging.

* * * * *